United States Patent
Lee et al.

(10) Patent No.: US 8,692,707 B2
(45) Date of Patent: Apr. 8, 2014

(54) CALIBRATION METHOD FOR AUTOMOTIVE RADAR USING PHASED ARRAY

(75) Inventors: Jae Seung Lee, Ann Arbor, MI (US); Paul Donald Schmalenberg, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 336 days.

(21) Appl. No.: 13/267,605

(22) Filed: Oct. 6, 2011

(65) Prior Publication Data

US 2013/0088382 A1 Apr. 11, 2013

(51) Int. Cl.
- *G01S 7/40* (2006.01)
- *H01Q 3/26* (2006.01)
- *G01S 13/93* (2006.01)

(52) U.S. Cl.
CPC ....... *G01S 7/4004* (2013.01); *G01S 2013/9375* (2013.01); *G01S 7/4026* (2013.01); *H01Q 3/267* (2013.01)
USPC .......................................... 342/174; 342/141

(58) Field of Classification Search
CPC ................ G01S 7/032; G01S 13/4463; G01S 2013/0245; G01S 7/40; G01S 7/4004; G01S 7/4026; H01Q 3/267
USPC ............... 342/174, 141, 157, 70–72
See application file for complete search history.

(56) References Cited

U.S. PATENT DOCUMENTS

| | | | |
|---|---|---|---|
| 5,027,127 A | 6/1991 | Shnitkin et al. | |
| 5,248,982 A | 9/1993 | Reinhardt et al. | |
| 5,412,414 A | 5/1995 | Ast et al. | |
| 5,559,519 A * | 9/1996 | Fenner | 342/174 |
| 5,682,165 A * | 10/1997 | Lewis et al. | 342/174 |
| 5,940,031 A * | 8/1999 | Turlington et al. | 342/372 |
| 6,208,287 B1 | 3/2001 | Sikina et al. | |
| 6,356,229 B1 | 3/2002 | Schneider | |
| 6,556,166 B1 | 4/2003 | Searcy et al. | |
| 6,686,873 B2 | 2/2004 | Patel et al. | |
| 6,714,156 B1 | 3/2004 | Ibrahim et al. | |
| 7,215,298 B1 | 5/2007 | Fraschilla et al. | |
| 7,346,994 B2 | 3/2008 | Shevela | |
| 7,522,096 B2 | 4/2009 | Backes et al. | |
| 7,714,775 B2 | 5/2010 | Navarro et al. | |
| 2002/0105456 A1 | 8/2002 | Isaji | |
| 2003/0090411 A1 | 5/2003 | Haney et al. | |

(Continued)

FOREIGN PATENT DOCUMENTS

JP 2013083645 A * 5/2013

OTHER PUBLICATIONS

Gabor Vinci et al., "Employing Six-Port Technology for Phase-Measurement-Based Calibration of Automotive Radar", In Microwave Conference Proceedings (APMC), 2009 Asia-Pacific, pp. 329-332, 2009.

*Primary Examiner* — John B Sotomayor
(74) *Attorney, Agent, or Firm* — Gifford, Krass, Sprinkle, Anderson & Citkowski, P.C.

(57) ABSTRACT

Examples of the present invention include calibration methods for phased array radar apparatus. The calibration methods include an electronic calibration of phase shifters, and compensation for mechanical misalignment. Approaches are particularly useful for automotive radar, and may be used for initial calibration after installation on a factory line, or at later times such as at a service station whenever recalibration becomes necessary.

11 Claims, 2 Drawing Sheets

(56) References Cited

U.S. PATENT DOCUMENTS

| | | |
|---|---|---|
| 2003/0160718 A1 | 8/2003 | Nagasaku |
| 2008/0150793 A1* | 6/2008 | Bast .............................. 342/174 |
| 2008/0224916 A1 | 9/2008 | Takagi |
| 2009/0027258 A1 | 1/2009 | Stayton |
| 2009/0201194 A1 | 8/2009 | Winkler et al. |
| 2009/0284406 A1 | 11/2009 | Cornic et al. |
| 2012/0086601 A1* | 4/2012 | Lee et al. ...................... 342/372 |
| 2013/0088382 A1* | 4/2013 | Lee et al. ...................... 342/174 |
| 2013/0214961 A1* | 8/2013 | Lee et al. ........................ 342/27 |
| 2013/0234880 A1* | 9/2013 | Lee et al. ........................ 342/70 |

* cited by examiner

CALIBRATION METHOD FOR AUTOMOTIVE RADAR USING PHASED ARRAY

FIELD OF THE INVENTION

The invention relates to calibration methods for radar apparatus, in particular automotive radars.

BACKGROUND OF THE INVENTION

Directional alignment is very important to the proper functioning of a radar apparatus. Automotive radar should be aligned in the direction of vehicular travel with precision, otherwise the radar will malfunction. Directional misalignment gives increased false alarms and missed detections.

The vehicular manufacturing process and installation methods of the radar typically do not allow for sufficient directional precision to be initially achieved, due to cost considerations. A calibration method to compensate for any misalignment would be extremely useful.

SUMMARY OF THE INVENTION

Examples of the present invention include calibration methods for a radar apparatus using phased array scanning techniques. The calibration method is particularly useful for automotive radar, and may be used for initial calibration after installation on a factory line, or at later times such as at a service station whenever recalibration becomes necessary.

Examples of the invention also include improved radar configurations, including a built in self-test (BIST) line that can be used for calibration of a radar apparatus. An example apparatus includes an antenna array, each antenna element having an associated adjustable phase shifter. The BIST line, for example on a separate dielectric layer or otherwise proximate the coupling between the phase shifters and antenna elements, couples to the antenna elements providing signals to the receiver. The phase relationships between the BIST line and each antenna element are known, based on the geometrical configuration of the radar, and these known phase relationships are used to calibrate the antenna array by adjusting the adjustable phase shifters until the correct phase shift is obtained.

After adjustment of the phase shifters, mechanical misalignment may be compensated for using a single radar target as a known predetermined azimuth direction. The target is detected using the radar, and the measured direction is obtained. The radar then self-adjusts using a compensation factor to adjust the misaligned direction to the known correct aligned direction to the radar target. This process is far simpler than techniques that require multiple calibration targets.

An improved two stage calibration process includes adjusting the relative phase shifts between each phase shifter using the BIST line, using an internal oscillator signal conveyed along a conducting track that couples to each phase shifter. In a second step, the misalignment angle of the radar unit is determined using a single test target at a known angle, and this may then be used to correct the radar data.

A method of improving operation a phased-array radar mounted on a vehicle includes calibrating the adjustable phase shifters using an internal self-test signal, and compensating for mechanical misalignment by detecting a radar target at along a detected direction. The difference between the detected direction and the true direction of the radar target relative to the vehicle is used to determine a misalignment factor, such as a misalignment angle. The misalignment factor is used to correct measurements made with the phased-array radar, to compensate for the actual mechanical misalignment, improving the operation (e.g. the accuracy) of the phased-array radar. An internal self-test signal may be generated at any suitable time by a test oscillator within the phased array radar, and conveyed along a self-test line running proximate the adjustable phase shifters.

The adjustable phase shifters may be re-calibrated at intervals during operation of the phased array radar using the internal self-test signal, to further improve the long-term accuracy of the radar operation. For a radar including both transmit and receive functions, the self-test signal is preferably generated (and the phase shifters calibrated) while the transmit antenna is not transmitting. The calibration may be relatively fast, for example completed in less than a second, and so calibration of the phase shifters may occur at intervals during operation of the radar, while the vehicle is in normal use. Calibration may occur, for example, during the following circumstances: when the radar is first turned on, when the vehicle is stopped, when the vehicle is moving slowly, whenever ambient conditions (e.g. temperature) change significantly, or at time intervals such as every hour. This flexibility in internal calibration has never before been possible.

For the first time, an automotive radar can be both electronically and mechanically calibrated in a simple process, for example available routinely at a dealer or service station. The electronic calibration of the phase shifters may be achieved by pressing a button on the radar housing, or achieved automatically at intervals. The mechanical calibration only requires a single radar target (though more than one may be used in some cases) at a known angle relative to the vehicle on which the radar is mounted.

An example phased array antenna comprises an antenna array (for example, an array of conducting patches), a phased array circuit connected to the antenna array by antenna connections, and a self-calibration circuit, including a test oscillator and a self-test line, the test oscillator generating a self-test signal when energized. Each antenna connection includes an adjustable phase shifter, which may be provided by a separate phase shifter chip, or in some cases a plurality of phase shifters may be provided by a single chip. In some cases, the phase shifters may be included with the phased array circuit into a single chip.

During electronic calibration, the phased array circuit receives calibration signals through the antenna connections. The calibration signals may be similar to e.g. received signals from the antenna in terms of frequency and amplitude. However, during electronic calibration the received power is preferably insignificant, and the calibration signals are provided by a test oscillator. The test oscillator generates a test signal, and the calibration signals are induced in the antenna connections by the self-test signal carried by a self-test line. The self-test line generates a separate calibration signal in each antenna connection that it passes proximate to. The phases of the calibration signals as they arrive at the phased array circuit (at least, relative to each other) are determined by mechanically fixed configuration details such as the length of the self-test line, length of the antenna connection, and the like. The only variable factor is the phase shifter. Therefore, the phase shifters can be adjusted (calibrated) to obtain, for example, accurate desired phase shift for any channel.

Hence, the adjustable phase shifter in each antenna connection is adjustable so the calibration signals, as they are received by the phased array circuit, have a predetermined phase. For example, the phase shifters can be calibrated to obtain zero phase shift in each channel, and/or phase shifts corresponding to a steered beam angle.

A radar apparatus may having a self-calibration mode, in which the self-test signal is generated and the adjustable phase shifter in each antenna connection (or antenna channel) is adjusted until the calibration signals have predetermined phase values. A self-calibration circuit may further include a phase adjustment circuit providing a phase adjustment signal to each adjustable phase shifter, such as an electrical bias signal.

The self-test line has a portion proximate the antenna connections, so that the self-test signal couples from the self-test line to the antenna connections. The antenna elements and the control circuit may be supported by a first layer of a circuit board, such as a multilayer circuit board, and the self-test line may be a conducting track supported by another layer of the circuit board.

DETAILED DESCRIPTION OF THE PREFERRED EMBODIMENTS

Figure 1:
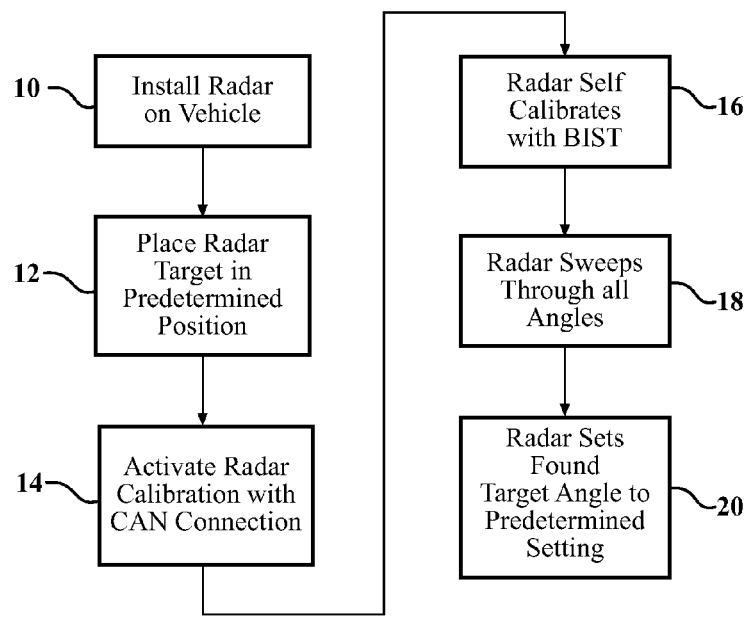
FIG. 1 shows a flowchart for an improved calibration process, using a built in self-test (BIST) line, and single target angle calibration.

Examples of the present invention provide improved apparatus and methods for obtaining directional alignment of a radar apparatus, in particular alignment of an automotive radar using a phased array with the direction of motion of a vehicle. An example approach includes provision of a built in self-test line within the radar apparatus. This self-test line, also referred to herein as a BIST line, may comprise a conducting track that runs proximate the antenna array elements or connections thereto.

In an example approach, an oscillator signal injected into the BIST line by a test oscillator is detected by the receive circuit through a coupling action between the BIST line and the antenna elements or electrical connections thereto. The calibration is performed while the transmit antenna is turned off. A BIST line may be supported on a separate substrate layer, for example underneath the array of phase shifters. Other configurations are possible, for example by running the BIST line on the opposite side of a dielectric substrate.

The receive chip determines the actual phase shift within the detected signal, and then adjusts the adjustable phase shifter associated with each antenna element until the correct phase shift is obtained.

The correct phase shift is determined by the geometry of the antenna array configuration. The phase varies continuously along the length of the BIST line, and this variation is known from the oscillator frequency and can be determined accurately. Using this approach, every phase shifter within the antenna array can be independently calibrated to the correct setting.

A further aspect of examples of the present invention is the subsequent directional alignment of a radar apparatus once supported on a vehicle. Typical factory assembly techniques may lead to a slight misalignment of a radar apparatus, for example one supported near the front of a vehicle. For example, the misaligned direction may be at a few degrees of the straight-on direction, the direction traveled by the vehicle with no steering input. A single radar target may be placed within the field of view of the radar, for example along the straight-on direction, and this single target is then detected by the radar apparatus. An adjustment factor may then be implemented electronically, to correct the detected data to correspond to the known alignment of the single radar target. A single correction then provides a usable aligned field of view for the radar, which may be slightly reduced and realigned from the misaligned field of view. However, the advantages of correct alignment are great.

The alignment techniques may be used with any phased array radar, in particular a phased array radar including a built in self-test line. The novel approaches save factory line time during specialized radar installation. Further, the calibration process does not require specialized training for the installer or subsequent service center personnel. There is no requirement for any expensive or complex mechanical jig based alignment system for calibration or recalibration, a great advantage over previous techniques that require such expensive mechanical alignment systems. Further, the supplier calibration of the sensor is greatly simplified.

Many current automotive radars use digital beam forming radars (DBF), which require a trained matrix to compute the target angle. In contrast, the alignment methods described herein for phased array radar are greatly simplified. One source of alignment error within an automotive radar is due to the limit of manufacturing tolerances when manufacturing phase shifting chips. The BIST line is useful for correcting such errors. The nature of a phased array is that absolute phase does not matter. The measurement is the relative difference of phase shift between each phase shifter. Examples of the present invention allow each phase shifter to correctly set its own DC bias to achieve the same phase shift as neighboring phase shifters, in particular the first phase shifter of an array. A radar apparatus can self-measure the phase shift of each shifter using the BIST line. This line is a small conductor, such as a metal track, that is situated proximate all phase shifters, for example below all of the phase shifters. In calibration, the transmit antenna is turned off, and a small RF signal is applied to the BIST line, which then couples into each phase shifter. The electronics associated with the receive antenna examine the detected signal, and then determine the correct DC bias setting for each shifter so that the relative phase shift between all the phase shifters is zero. This calibration approach is achieved internally, within the radar apparatus, without the use of any exterior targets being necessary.

Other alignment errors may occur due to misalignment of the radar unit into a protective casing, and placement of the radar unit onto a mounting bracket of the vehicle. These errors are mechanical misalignments. These mechanical misalignments can be simply compensated for after the internal calibration described above. A single radar target is placed at a known bearing relative to the vehicle. The target can be any typical radar target, preferably having a large radar cross section, such as a corner reflector. For example, the bearing may be between –20 degrees and +20 degrees at the front of the vehicle. The exact choice of angle is not important, but is predetermined before a production run. The target may be placed proximate a factory line during assembly of the vehicle, for example within a repeatable location. During mechanical calibration, the radar is operated so as to sweep its angular range and uses the target position as a reference. The radar's uncorrected detected target location is compared to the predetermined actual target location, and the internal data handling compensated for so that the radar then gives the correct bearing for the target position. Once the actual and detected target locations are correlated through a compensation factor (the misalignment factor), mechanical errors are compensated. All scanning angles for the radar are now calibrated, as all relative scan angles are corrected using the BIST approach.

FIG. 1 is a flowchart illustrating a possible implementation of the improved calibration process. Box 10 corresponds to installing the radar on a vehicle. Box 12 corresponds to placing the radar target in a predetermined position. Box 14 corresponds to activating radar calibration, for example with a CAN connection. Box 16 corresponds to self-calibration of the radar using the self-test (BIST) line. This self-calibration compensates for relative phase shift errors between the phase shifters of the antenna array. This may be termed an electronic calibration, as it adjusts electronic components of the radar, in particular the phase shifters. Box 18 then corresponds to the radar sweeping through angles within its field of view. Box 20 corresponds to setting the detected target angle (the detected bearing of the target, including the effects of mechanical misalignment) to a predetermined setting, the actual or true bearing of the target relative to the vehicle. After this process, the radar is compensated for both electronic and mechanical misalignments.

The process steps shown in FIG. 1 need not be carried out in exactly the order illustrated. For example, the BIST line may be used for electronic calibration (with calibration of electronic alignment problems through adjustment of the phase shifters) before the radar is installed on the vehicle, and/or electronic calibration may be performed one or more times after installation, such as during vehicle operation. Preferably, a BIST-based electronic alignment is performed before correcting for the mechanical misalignment.

Figure 2:
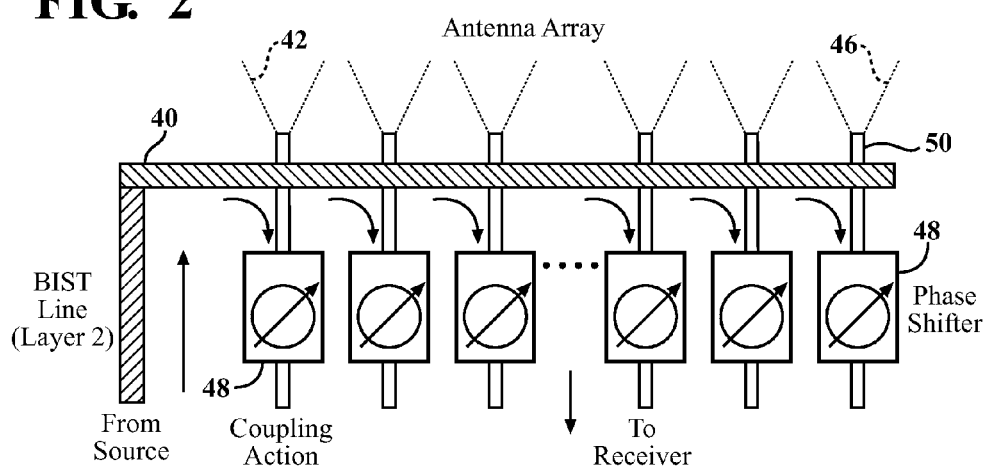
FIG. 2 is a simplified schematic of an antenna array including a BIST line.

FIG. 2 is a simplified schematic of a radar apparatus illustrating the use of a BIST line. Part of the BIST line is shown at 40, and at one end is connected to a test oscillator (denoted "From Source" in the figure, the source being the test oscillator). The BIST line has a portion proximate antenna elements or the connections. Representative antenna elements are shown at 42 and 46, and some intervening antenna array elements are illustrated as well. The curved arrows between the BIST line and phase shifters (44, 48) represent a degree of electronic coupling between the BIST line and the electrical interconnections between the antenna array and the associated phased array receive chip.

The BIST line and antenna connections (e.g. 50) may be separated by at least one dielectric layer at the illustrated crossing points. In some examples, an intervening conducting shielding layer may be located between the BIST line and antenna components, having coupling apertures located beneath the antenna elements allowing electrical coupling to occur through the apertures.

The lower end of the antenna connections, as illustrated, are connected to the phased array circuit controlling the antenna. The figure is simplified, and in some examples the antenna connections between the antenna elements and phased array circuit may include a phase shifter (as shown), amplifier, or other components.

For example, the aim of the calibration may be to set each phase shifter to an identical value. The phase of the BIST signal varies as it travels along the line 40, but this variation is known from the geometrical configuration, and hence the phase shifters can be set so that this known signal phase is obtained from each phase shifter. After this is done, the relative phase shift between each phase shifter is zero.

In operation, a low powered RF signal is sent along the BIST line on, for example, a second antenna substrate layer, from a source oscillator. The transmitter is turned off during this process. The BIST line travels on a separate substrate layer underneath the phase shifters. The BIST signal couples through the substrate onto the conductors leading to the phase shifters. The actual phase difference received by the phase shifters of the BIST signal is dependent on the length of the line between the oscillator and each phase shifter and as this length is known, calibration of the phase shifters is accurately achieved.

An example radar apparatus may have various operational modes. For example, with the test oscillator off, the antenna may perform as a conventional phased array receiver. The radar may also have a self-calibration mode, as described herein, by which the phase shifters are calibrated. This electronic calibration may be achieved in seconds, and in some examples in milliseconds. Hence, electronic calibration of the phase shifters may occur even during operation of the radar on a vehicle, a never-before achieved technical advantage. The phase shifters may be implemented in SiGe chips, or other electronic devices.

A radar apparatus may include a BIST-calibrated receive antenna, and a non-steerable transmit antenna. However, in other examples the transmit antenna may also be steerable. In some examples, transmit antennas may also be calibrated using a BIST line, allowing phase shifters to be adjusted to calibrated values. An apparatus may comprise a housing including a substrate, with the antenna array elements, phased array circuit(s), and electrical interconnections between the phased array circuit and antenna array disposed on the substrate. The substrate may include a planar dielectric material, for example in a multi-layer printed circuit board. The self-test line may be supported by the first layer, and the antenna connections on another layer. An intervening conducting layer may having coupling apertures registered with each antenna connection.

In one transmit antenna approach, the transmit chip may also function as a receive chip during the self-calibration, and the BIST line used to generate calibration signals as for receive chip calibration. In another transmit antenna calibration approach, the transmit chip is turned off, the transmit antenna elements energized using the self-test line (in this case, located between the phase shifters and the transmit chip), and beam properties optimized using phase shifter calibration.

Figure 3:
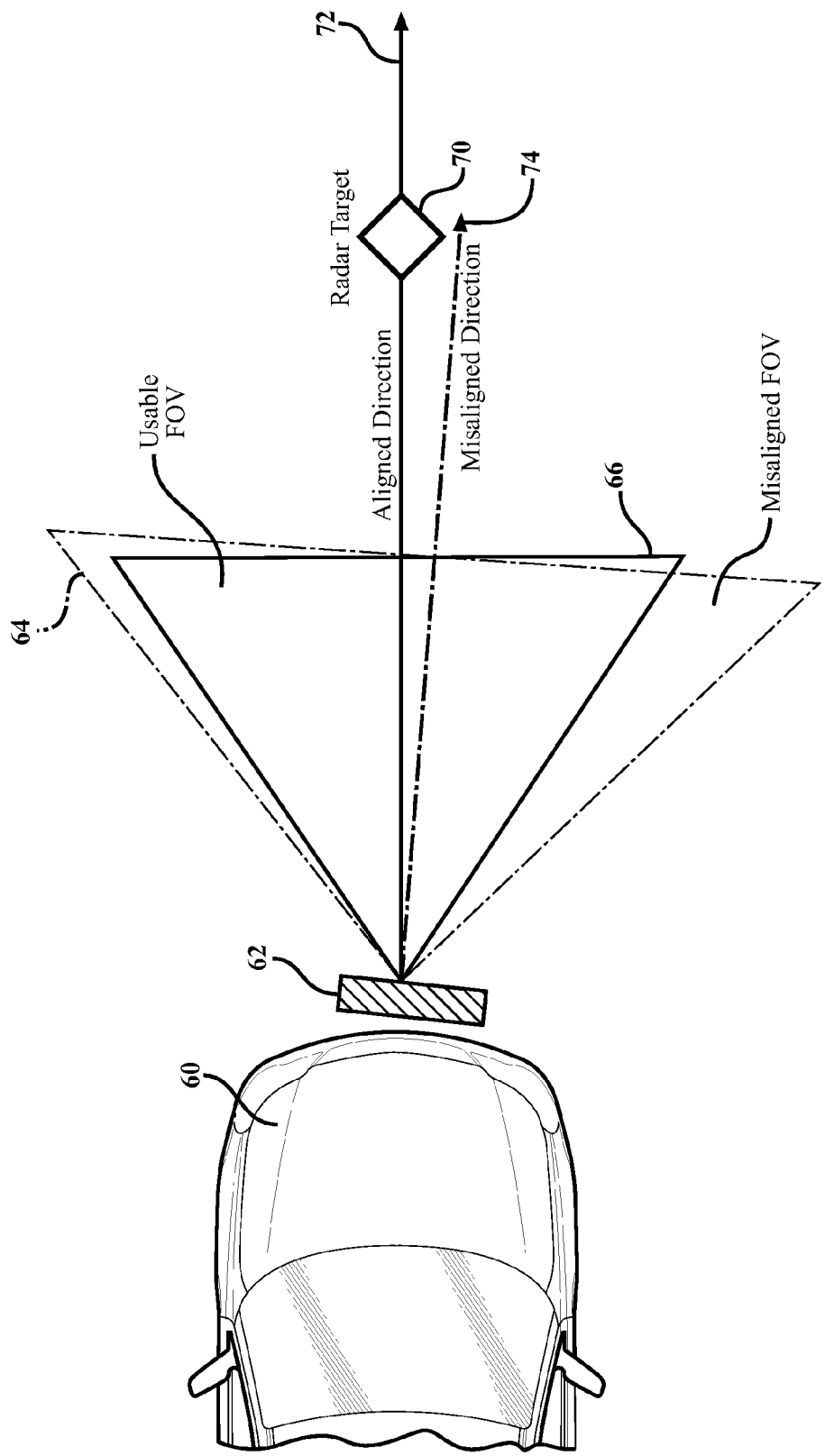
FIG. 3 illustrates a method of directional alignment to obtain internal compensation for mechanical misalignment of a radar apparatus on an associated vehicle.

FIG. 3 illustrates compensation for mechanical misalignment. The figure shows a radar apparatus 62 supported on vehicle 60, having an initial misaligned field of view denoted by dotted line 64. A radar target is placed at 70, along the straight-on direction denoted by arrow 72. The radar is then operated and the target is detected during operation of the radar. The initial (uncorrected) detected direction of the target is incorrect due to the misalignment of the radar, as indicated by the dotted line 74 labeled "misaligned direction." However the true direction of the target is predetermined and hence known, so that the apparatus can compensate for the misalignment by comparing the initial detected direction with the known actual direction, and applying a compensation factor (or misalignment factor) to recover the correct direction from the detected data. In this way, internal compensation for mechanical misalignment is achieved without requiring any mechanical adjustment of the radar whatsoever. This process is far simpler than any approach that requires sophisticated or complex alignment jigs.

FIG. 3 shows the radar 62 placed on the front of vehicle 60, misaligned in the azimuth direction. In the calibration process, a radar target 70 is placed at a known angle 72, that the radar apparatus is preprogrammed to know. For example, the radar may include a memory storing the predetermined calibration target direction. The radar sweeps the beam through the initial misaligned field of view (shown by dotted line 64), and then sets the detected angle of the target to the preprogrammed angle using the misalignment factor. The radar's different beams are proportional to each other, so that all beam angles can be compensated for using this single measurement and compensation factor. The radar then remaps the misaligned field of view onto the calibrated coordinate system to give the usable and aligned field of view denoted by the solid line 66 in FIG. 3. To maintain field of view symmetry, a small amount of the field of view is not used.

Hence, by detecting a radar calibration target, and comparing the detected direction of the radar target with a preprogrammed true direction of the radar target, a misalignment factor is determined that can be used to correct subsequent measurements. In FIG. 3, the misalignment factor may be represented by a misalignment angle, as shown between dashed line 74 and true direction of the target along line 72. For vehicular radars, the true direction of the target is relative to the vehicle, in particular the straight-on forward direction of the vehicle. Similar approaches can be used to calibrate rear and side-facing radars. A single misalignment factor can then be used to correct subsequent measurements made with the phased-array radar, to obtain improved radar accuracy. FIG. 3 shows the target as being in a generally straight on direction from the vehicle, but other angles may be used, preferably well within the field of view.

The mechanical calibration process is performed electronically, using the misalignment factor as an internal correction factor which may be stored, for example, in a memory location of the radar apparatus. There is no need to mechanically adjust the radar apparatus. In some cases of great misalignment, a rough mechanical alignment may be performed, followed by the determination of a misalignment factor as described above.

The invention is not restricted to the illustrative examples described above. Examples described are exemplary, and are not intended to limit the scope of the invention. Changes therein, other combinations of elements, and other uses will occur to those skilled in the art.

Having described our invention, we claim:

1. An apparatus, the apparatus being a phased array radar comprising:
   an antenna array;
   a phased array circuit, connected to the antenna array by a plurality of antenna connections,
   each antenna connection of the plurality of antenna connections including an adjustable phase shifter; and
   a self-calibration circuit, including a test oscillator and a self-test line, the test oscillator generating a self-test signal when energized;
   the phased array circuit receiving calibration signals through the plurality of antenna connections when the test oscillator is energized, the calibration signals being induced in the plurality of antenna connections by the self-test signal carried by the self-test line,
   the adjustable phase shifter of each antenna connection being adjustable so the calibration signals have predetermined phases.

2. The apparatus of claim 1, the apparatus having a self-calibrating mode in which the adjustable phase shifter of each antenna connection is adjusted so the calibration signals have predetermined phases.

3. The apparatus of claim 1, the self-test line having a portion proximate the plurality of antenna connections, the self-test signal coupling from the self-test line to the plurality of antenna connections.

4. The apparatus of claim 1, the antenna array being a phased array receive antenna, the phased array circuit being a phased array receive circuit.

5. The apparatus of claim 1, the antenna array and the phased array circuit being supported by a first layer of a circuit board,
   the self-test line being a conducting track supported by a second layer of the circuit board.

6. The apparatus of claim 1, the self-calibration circuit further including a phase adjustment circuit providing a phase adjustment signal to the adjustable phase shifter of each antenna connection,
   the phase adjustment signal being an electrical bias signal.

7. An apparatus, the apparatus being a phased array radar comprising:
   an antenna array, including a plurality of antenna elements;
   a phased array circuit, the phased array circuit being a receive circuit;
   antenna connections electrically interconnecting the receive circuit and the antenna array, each antenna connection including an adjustable phase shifter;
   a test oscillator circuit; and
   a self-test line electrically connected to the test oscillator circuit, including a self-test line portion located proximate the antenna connections,
   the apparatus having an operating mode in which the receive circuit receives antenna signals from the plurality of antenna elements,
   the apparatus further having a self-calibrating mode in which the test oscillator circuit generates a self-test signal carried by the self-test line, the receive circuit receiving calibration signals induced in the antenna connections by the self-test signal,
   the adjustable phase shifter of each antenna connection being adjustable in response to calibration signal phases.

8. The apparatus of claim 7, the self-test line having a portion proximate the antenna connections, the self-test signal coupling from the self-test line to the antenna connections to induce the calibration signals in the antenna connections,
   the calibration signals passing through the adjustable phase shifter of each antenna connection before reaching the receive circuit.

9. A method of improving operation of a phased-array radar mounted on a vehicle, the phased array radar including a phased array circuit in electrical communication with an antenna array through adjustable phase shifters, the method comprising:
   calibrating the adjustable phase shifters using an internal self-test signal; and
   detecting a radar target, a detected direction of the radar target being compared to a true direction of the radar target relative to the vehicle to determine a misalignment factor,
   the misalignment factor being used to correct measurements made with the phased-array radar,
   so as to obtain improved operation of the phased-array radar.

10. The method of claim 9, the internal self-test signal being generated by a test oscillator within the phased array radar and conveyed along a self-test line running proximate the adjustable phase shifters.

11. The method of claim 9, further including re-calibrating the adjustable phase shifters at intervals during operation of the phased array radar using the internal self-test signal.

* * * * *